(12) United States Patent
Gao et al.

(10) Patent No.: US 10,146,456 B1
(45) Date of Patent: Dec. 4, 2018

(54) DATA STORAGE SYSTEM WITH MULTI-LEVEL, SCALABLE METADATA STRUCTURE

(71) Applicant: EMC IP Holding Company LLC, Hopkinton, MA (US)

(72) Inventors: Hongpo Gao, Beijing (CN); Jian Gao, Beijing (CN); Wayne Li, Beijing (CN); Shaoqin Gong, Beijing (CN); Jibing Dong, Beijing (CN); Lili Chen, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 69 days.

(21) Appl. No.: 15/395,869

(22) Filed: Dec. 30, 2016

(51) Int. Cl.
*G06F 12/00* (2006.01)
*G06F 13/00* (2006.01)
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC ..... G06F 3/0619; G06F 3/0665; G06F 3/0689
USPC ........................................................ 711/114
See application file for complete search history.

(56) References Cited

U.S. PATENT DOCUMENTS

| | | | | |
|---|---|---|---|---|
| 6,912,537 | B2 * | 6/2005 | Selkirk | G06F 3/0608 |
| 7,904,652 | B1 * | 3/2011 | Castelli | G06F 3/0605 |
| | | | | 709/225 |
| 8,078,905 | B1 * | 12/2011 | Vipul | G06F 11/1415 |
| | | | | 714/6.1 |
| 8,082,330 | B1 * | 12/2011 | Castelli | G06F 9/5016 |
| | | | | 709/220 |
| 8,140,860 | B2 * | 3/2012 | Haswell | G06F 3/0619 |
| | | | | 713/165 |
| 8,151,048 | B1 * | 4/2012 | Premkumar | G06F 3/0605 |
| | | | | 710/305 |
| 8,255,803 | B1 * | 8/2012 | McAdam | G06F 3/0605 |
| | | | | 711/114 |
| 8,407,437 | B1 | 3/2013 | Cheng et al. | |
| 8,429,346 | B1 * | 4/2013 | Chen | G06F 3/0613 |
| | | | | 709/213 |
| 8,843,459 | B1 * | 9/2014 | Aston | G06F 17/30067 |
| | | | | 707/694 |
| 9,176,681 | B1 * | 11/2015 | Xu | G06F 3/0631 |
| 9,244,632 | B1 * | 1/2016 | Foley | G06F 3/0689 |
| 9,395,937 | B1 * | 7/2016 | Si | G06F 3/0689 |
| 9,477,431 | B1 * | 10/2016 | Chen | G06F 3/0689 |
| 9,542,125 | B1 * | 1/2017 | Chen | G06F 3/0679 |
| 9,846,544 | B1 * | 12/2017 | Bassov | G06F 3/0617 |

(Continued)

*Primary Examiner* — Sheng Jen Tsai
(74) *Attorney, Agent, or Firm* — BainwoodHuang (57) ABSTRACT

A data storage system creates, maintains and utilizes logical storage structures including (1) a pool of device extents on user devices, organized into data portions of mapped RAID groups each having a data portion and a RAID group metadata element having (i) a basic portion and (ii) a mapping portion mapping each set of device extents to logical RAID extents per RAID type, (2) a pool logical device (e.g., an internal mapped RAID) in the pool, storing the mapping portions of the metadata elements of the mapped RAID group, and (3) a system logical device on separate system devices, storing (i) the basic portions of the metadata elements of the RAID groups, and (ii) a pool metadata element including a pool mapping portion for the pool logical device.

13 Claims, 11 Drawing Sheets

(56) References Cited

U.S. PATENT DOCUMENTS

| | | | | |
|---|---|---|---|---|
| 9,875,043 | B1* | 1/2018 | Suldhal | G06F 3/0619 |
| 2008/0120462 | A1* | 5/2008 | Nehse | G06F 3/0605 |
| | | | | 711/114 |
| 2008/0288683 | A1* | 11/2008 | Ramey | G06F 13/4022 |
| | | | | 710/105 |
| 2009/0240882 | A1* | 9/2009 | Shiga | G06F 3/0607 |
| | | | | 711/114 |
| 2012/0158652 | A1 | 6/2012 | Ps et al. | |
| 2012/0185646 | A1* | 7/2012 | Ikawa | G06F 3/0625 |
| | | | | 711/114 |
| 2013/0111127 | A1* | 5/2013 | Araki | G06F 3/0605 |
| | | | | 711/114 |
| 2015/0370823 | A1* | 12/2015 | Laker | G06F 17/3007 |
| | | | | 707/743 |

* cited by examiner

DATA STORAGE SYSTEM WITH MULTI-LEVEL, SCALABLE METADATA STRUCTURE

BACKGROUND

How to store the system configurations is very important. We need protect the data with redundancy. For example, we can store the data in 3 disks with triple mirror redundancy/protection.

In known data storage systems, system configurations are stored in a centralized location, such as over the first four drives in an enclosure which are denoted system drives. A 3-way mirror RAID group may be used to store the system configuration/internal metadata, to provide desired protection against loss. When booting up the system with the system drives, all configurations/metadata are loaded from the first four drives into memory and the system is set up using the loaded data. In a system using an active-passive arrangement of storage processors (SPs), an active SP performs these actions for itself and then synchronizes the configurations/metadata to the passive SP, which then sets up the topology with the configurations in memory which it received from the active SP.

SUMMARY

In known data storage systems, the system configurations and metadata for logical structures such as provisioned devices, RAID groups, and logical units (LUNs) is not very large, and this information is not updated between memory and disks very frequently. Storing all this information on the system drives is convenient and does not create any capacity or performance issues.

The situation changes when so-called "mapped RAID" is employed, which is a virtualization technology on the disk level. In mapped RAID, whole disks are divided into a large number of extents, and the RAID algorithms operate on the disk extents instead of the whole disk. The RAID algorithms may not be any different, but the resource unit manipulated by the RAID algorithms changes from entire disks to pieces (extents) of disks.

The traditional method of storing all configurations/metadata on the system devices would generally not be sufficient to meet desired performance requirements in a mapped RAID system. The available storage space from the limited number of system drives may not be large enough to store all the configurations metadata. Additionally, this approach would not be very scalable, such as when additional disk pools are added to a data storage system. Generally, the limited I/O bandwidth to the system drives might serve as a bottleneck if the configurations for all mapped RAID groups are stored in the system drives.

Thus in one aspect the disclosure is directed to a multi-level scalable method to store a large capacity of storage array configuration and its internal metadata. The configurations/metadata are divided into separate parts, one of relatively smaller size and access frequency, and the other of relatively larger size and greater access frequency. The part of the system configurations/metadata with small size and less access frequency are stored in a centralized location, such as the system drives, for ease of management and access. The part with larger size and greater access frequency is stored across the user devices in pools having dedicated space for storing their own configurations, enhancing scalable both in capacity and performance. The scalable storage is managed with disk extents and mapped RAID technology, which is more flexible. It can also be self-managed, i.e., employ automatic swapping of bad disk extents with good ones by a background More particularly, a data storage system is disclosed that includes a set of storage devices, processing circuitry, host interface circuitry coupling the processing circuitry to remote host computers, and device interface circuitry coupling the processing circuitry to the storage devices. The processing circuitry is configured and operative to execute computer program instructions of functional components to (a) organize the storage devices as system devices and user devices, and (b) create, maintain and utilize logical storage structures, including:

1) a pool of device extents on the user devices, the device extents organized into data portions of mapped RAID groups storing user data, each data portion including one or more sets of device extents, each mapped RAID group having a respective data portion and a respective RAID group metadata element having (i) a respective basic portion and (ii) a respective mapping portion mapping each set of device extents of the RAID group to a smaller number of logical RAID extents based on a RAID type of the RAID group;

2) a pool logical device (which may be an internal mapped RAID) in the pool, the pool logical device storing the mapping portions of the metadata elements of the mapped RAID groups stored in the pool; and 3) a system logical device stored on the system devices, the system logical device storing (i) the basic portions of the metadata elements of the RAID groups stored in the pool, and (ii) a pool metadata element including a pool mapping portion for the pool logical device.

By storing the mapping portions of the metadata elements of the mapped RAID groups in the pool logical device, scalability in both capacity and performance is enhanced over prior techniques in which the metadata elements of RAID groups was all stored in a centralized location such as a system device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
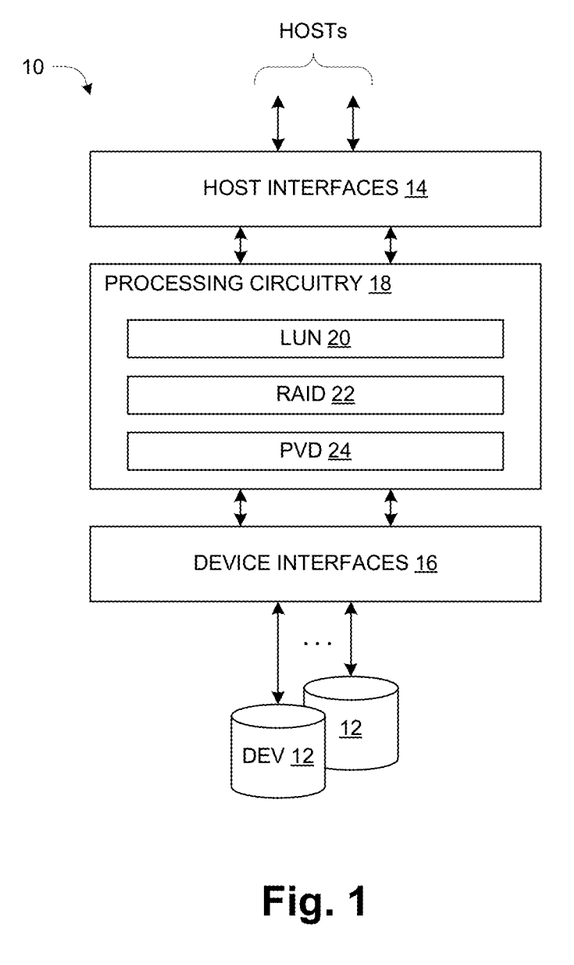
FIG. 1 is a block diagram of a data storage system.

FIG. 1 shows a data storage system 10 which provides data storage services to host computers (HOSTS) (not shown) using data storage devices (DEVs) 12, such as magnetic disks, Flash memory, etc. The devices 12 are also referred to as "disks" herein. From a hardware perspective, the data storage system includes host interfaces 14, device interfaces 16, and processing circuitry 18. Both the host interfaces 14 and device interfaces 16 are typically interfaces to storage-oriented interconnects, such as FibreChannel, iSCSI, etc. The processing circuitry 18 includes one or more processors, memory and I/O interface circuitry connected together by high-speed, intra-system interconnect (details not shown), as generally known in the art. The processing circuitry 18 executes computer program instructions to form functional operation components in three layers as shown: a logical unit (LUN) layer 20, a Redundant Array of Independent Disks (RAID) layer 22, and a provisioned device (PVD) layer 24. The components work together in a coordinated manner to provide storage functionality as generally known in the art. One general example of data storage systems having a structure like that of FIG. 1 are systems sold under the trademark VNX® by Dell EMC. It should be noted that the processing circuitry 18 may implement components at additional functional layers, especially above the LUN layer 20. Such additional layers may include a host file system layer, virtualization layer, etc.

Figure 2:
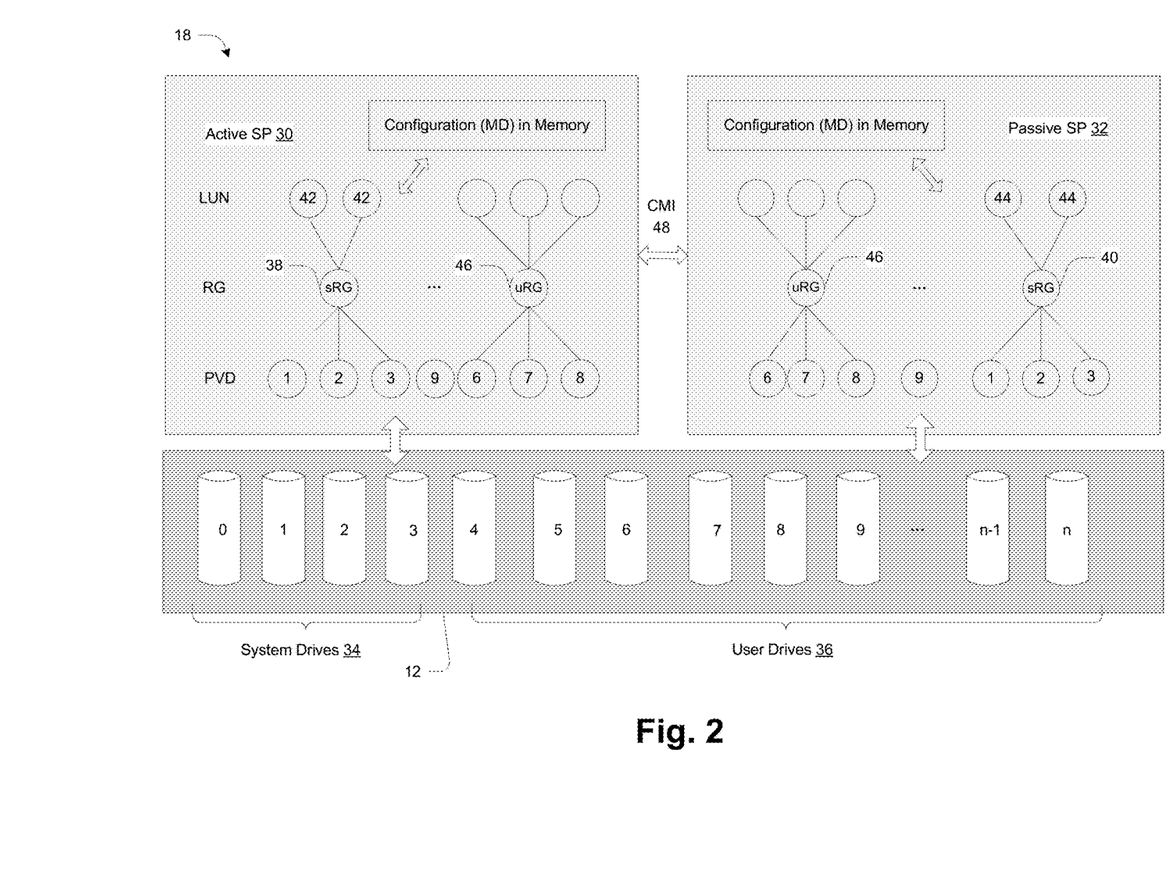
FIGS. 2-4 are schematic diagrams of data and metadata organizations of a data storage system.

FIG. 2 illustrates a known arrangement of system configuration management in which certain metadata referred to as "system configurations" are stored in a centralized location. In this example, the processing circuitry 18 is shown as including two storage processors or "SPs"—an active SP 30 and a passive SP 32. The techniques herein may also be applied to systems employing so-called "active-active" sets of SPs. The storage devices or "drives" 12 are organized into system drives 34 and user drives 36. In one example, the system drives 34 may be the first four drives of an enclosure, for example. In each SP 30, 32, a respective 3-way mirror "system" RAID group (sRG) 38, 40 is defined to store the system configurations and other metadata (MD). Respective PVDs (numbered 1-3) are defined on the four system drives 34, and respective LUNs 42, 44 are defined on the sRGs 38, 40 to provide application access to the stored metadata.

In operation, when booting up from the system drives 34, all configurations/metadata from these drives 34 is loaded into memory and the system is set up from that loaded data. More particularly, the active SP 30 connects to the system drives 34 and loads configurations/MD into its memory. Then the active SP 30 sets up the system topology with the configurations. As shown in FIG. 2, the topology is composed of all PVD, RG and LUN objects in the system (including "user" RAID groups (uRGs) 46 storing user data). The configurations are synchronized to the passive SP 32 across an inter-SP connection shown as a common memory interconnect (CMI) 48. Then the passive SP 32 sets up the topology in its memory using the configurations received from active SP 30.

As noted above, if the system configuration and MD is not too large and not updated between memory and disks very frequently, the centralized storage of all this data on the system drives 34 does not present a performance issue. This is the case using conventional RAID in which RAID groups are defined as collections of entire drives 12. There is a relatively limited maximum number of such RAID groups in a system, even if the system supports a large number of underlying physical drives. If a system supports up to 500 drives and employs six-disk RAID-6, then there is a maximum of approximately 80 RAID groups and thus 80 sets of configuration information. In such a case it is convenient to store all the configuration MD in one sRG 38 or 40 configured as a 3-way mirror for a desired high level of protection.

Disk Pool and Mapped RAID

The situation changes when so-called "mapped RAID" is employed, which is a virtualization technology on the disk level. In mapped RAID, whole disks are divided into a large number of extents, and the RAID algorithms operate on the disk extents instead of the whole disk. The RAID algorithms may not be any different, but the resource unit manipulated by the RAID algorithms changes from entire disks to pieces (extents) of disks.

Figure 3:
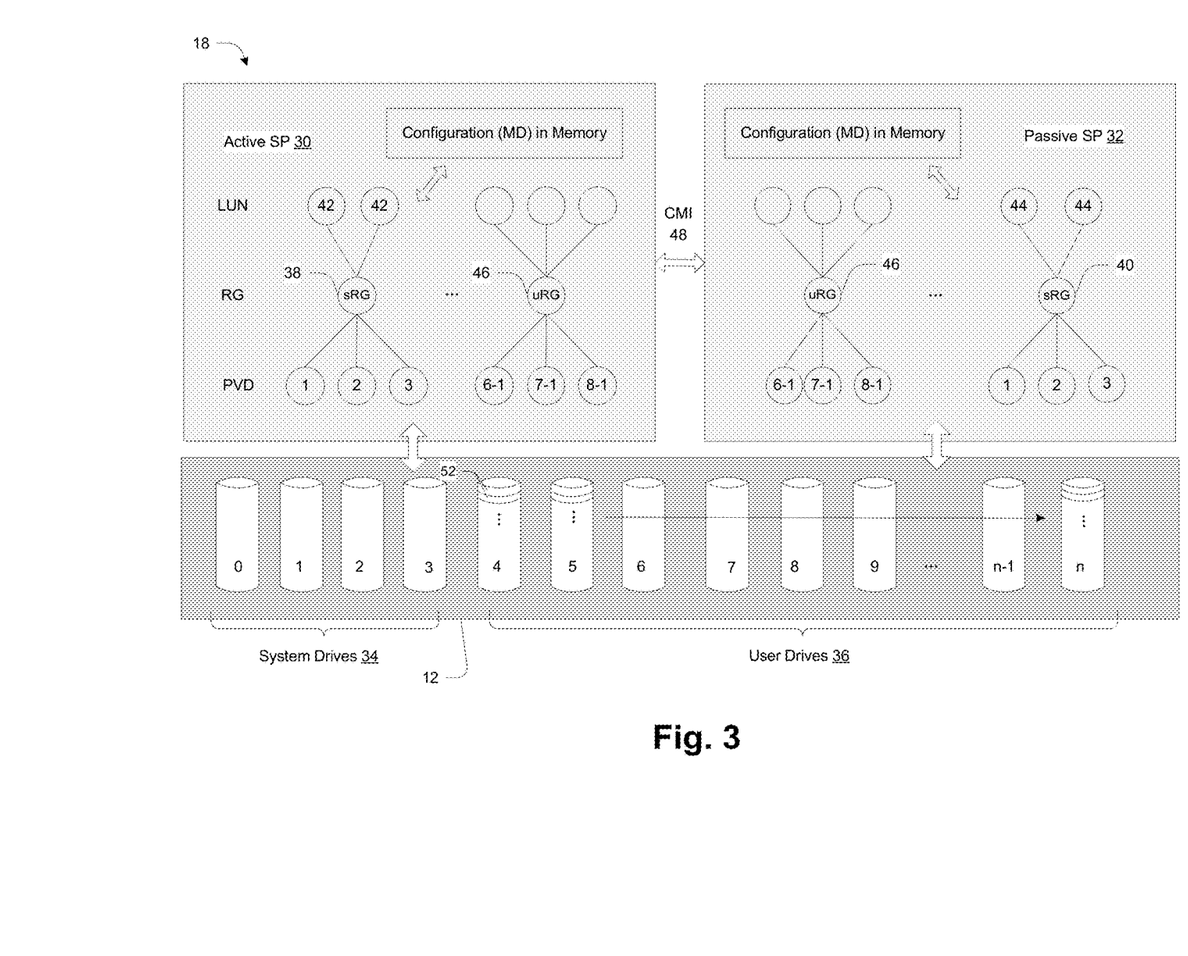

FIG. 3 illustrates a structure similar to that of FIG. 2 but employing mapped RAID. The user RAID groups (uRGs) 46 are shown as being formed of sets of disk extents 52. In the simplified example of FIG. 3, a uRG 46 is formed of three extents identified as 6-1, 7-1, 8-1, meaning the respective first extent of each of disks 6, 7 and 8. Generally there are many disk extents 54 on a given disk 12. As an example, if the extent size is 256 MB and the disk size is 30 TB, then there are approximately 120 k extents on each disk 12. As described more below, a pool structure is used to manage disk extent status and the mappings between mapped RGs and disk extents. Because RAID is applied at the extent level rather than the disk level, there are generally many more RAID groups, and a correspondingly greater amount of configuration data (metadata) to record the disk status and mapping information. The configuration/metadata size may be hundreds of gigabytes when a disk pool has many disks and the disk extent size is small. In addition, the mapping information in particular may be accessed and updated more frequently than in traditional RAID, so it is important to avoid bandwidth bottlenecks to avoid performance penalties.

As an example, the device extents 52 may have an extent size less than $\frac{1}{1000}$ of the storage capacity of a single user device 36, and there may be a sufficient number of user devices 36 that a sum of sizes of RAID group metadata elements for all mapped RAID groups on the user devices 36 is some appreciate fraction (e.g., greater than $\frac{1}{100}$) of the storage capacity of the system drives 34.

The traditional method of FIG. 2 would generally not be sufficient to meet desired performance requirements in a mapped RAID system. The available storage space from the limited number of system drives 34 may not be large enough to store all the configurations metadata. Additionally, this approach would not be very scalable, such as when additional disk pools 54 are added to a data storage system 10. Generally, the limited I/O bandwidth to the system drives 34 might serve as a bottleneck if the configurations for all mapped RGs are stored in system drives 34.

In an alternative approach, the metadata for both the overall disk pool and the mapped RGs 46 are classified into two separate types—a part which is relatively small and not updated frequently, and a remainder part that is larger and generally updated more frequently. The first part is referred to as "basic configuration" information, and this part is stored in a centralized location such as system drives 34. The remainder part which is large and accessed more frequently is referred to as "mapping" information, and this part is stored in separate internal space of each pool. When a disk pool is created, a respective pool device (which may itself be an internal mapped RG) is created for storing the mapping information. Details and use of this structure are described below.

Figure 4:
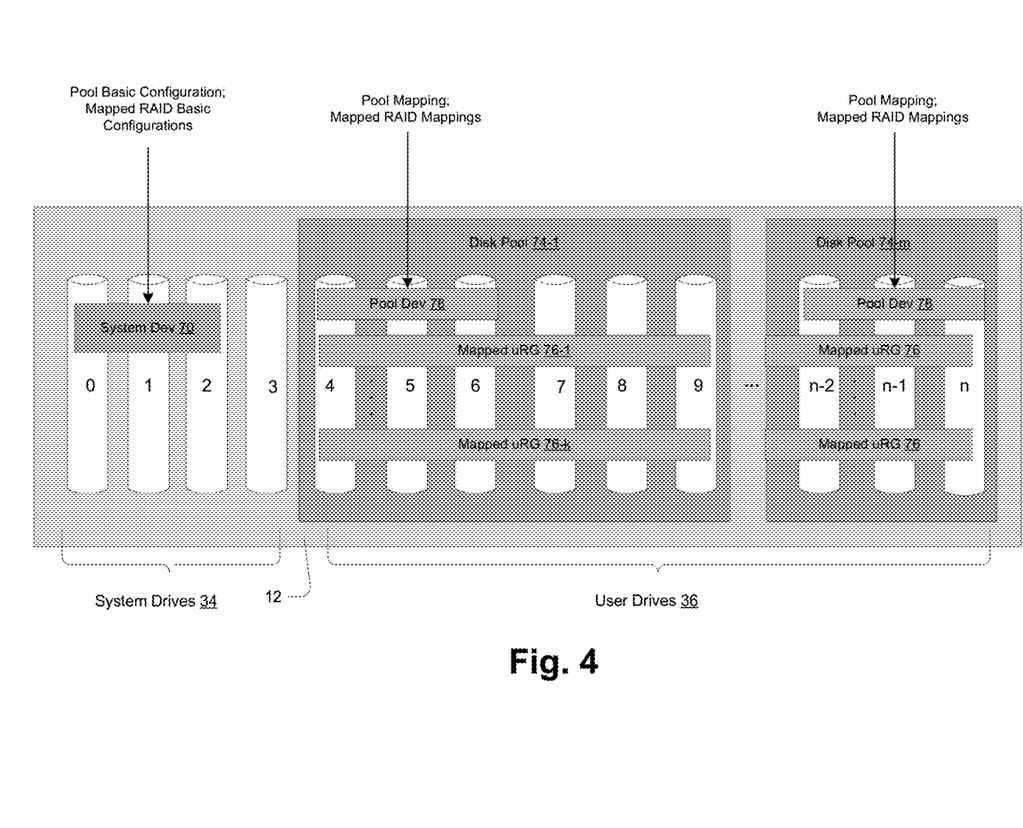

FIG. 4 shows a multi-level storage layout for mapped RAID and disk pools. The system drives 34 store a logical device shown as a system device (Dev) 70, which in one embodiment may be a 3-way mirrored RAID group such as sRG 38 (FIGS. 2 and 4). The system device 70 stores the pool basic configuration and mapped RAID basic configurations, which are described below. The user drives 36 are organized into disk pools 74 (74-1, . . . , 74-$m$ shown) that each store mapped RAID groups for user data (shown as mapped uRGs 76), as well as a respective pool device 78 that stores both a pool (disk extent) mapping and the mappings for the mapped uRGs 76. The disk pools 74 are also referred to herein as "extent pools", reflecting the division of the disks 12 into extents that are separately allocable to RAID groups.

Managing Configurations for Mapped RAID and Disk Pool

Figure 5:
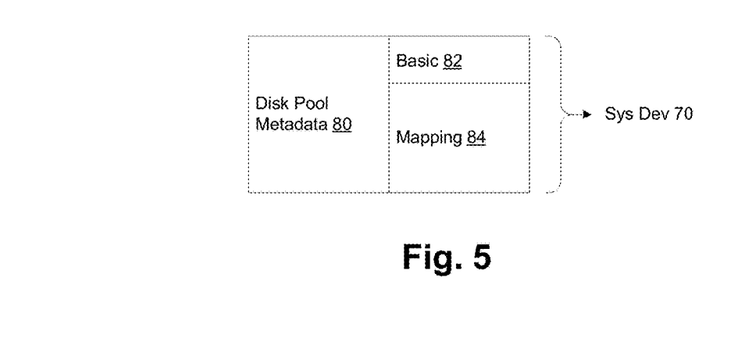
FIG. 5 is a schematic diagram of a disk pool metadata element.
Figure 6:
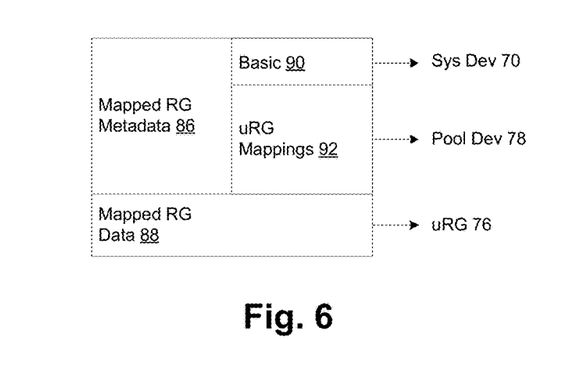
FIG. 6 is a schematic diagram of a mapped RAID metadata element.

FIGS. 5 and 6 illustrate structure and placement of both data and metadata for a disk pool 74 and a mapped RAID (e.g., 46) respectively. As shown in FIG. 5, the disk pool metadata 80 includes pool basic configuration 82 and pool mapping 84, both stored on the system device 70 as explained above. Details of these structures are provided below. FIG. 6 shows that a mapped RAID group includes both mapped RG metadata 86 and mapped RG data 88 (i.e., the user data stored in the RAID group). The mapped RG metadata 86 includes mapped RG basic configuration 90 and mapped RG mappings 92. While the mapped RG basic configuration 90 is stored on the system device 70, the uRG mappings 92 are stored on the pool device 78, which is on the same user disks 36 that store the mapped RG data 88 (as uRG 76). When the pool device 70 is implemented as a mapped RG, its mappings are actually stored as part of the mapped RG basic configuration 90, as explained below.

1. Basic Configuration

The configuration/metadata for both Mapped RAID and disk pool fall into two categories: basic object configurations (82, 90), and mapping metadata (84, 92). The basic object configurations are not very large (e.g., less than 10 MB for 1000 drives with mapped RAID) and are generally accessed only infrequently. So the basic object configurations 82, 90 are stored in the system drives 34 (in system device 70) as in the traditional method.

In one embodiment, the following is the content of the disk pool basic configurations 82 for a given pool 74:

| Field | Description |
| --- | --- |
| Width | Number of disks In the disk pool |
| Disk extent size | The disk extent size in blocks |
| Drive type | The types of storage devices in pool, e.g., SAS, NS-SAS, SSD, etc |
| Generation number | Generation number is initialized when first created |
| Disk_SN[ ] | Identifies member disks by serial number |

In one embodiment, the following is the content of the mapped RAID basic configurations 90 for a given pool 74:

| Field | Description |
| --- | --- |
| Width | The number of extents in RAID extents |
| Capacity | The overall capacity of mapped RAID |
| Raid type | The RAID type (e.g., RAID-5, RAID-6) |
| Generation number | Generation number is initialized when first created |
| Is_internal | Is this mapped RAID an internal RG |
| Disk_extent_count | The disk extent count for internal mapped RAID |
| Disk_extent_mapping[ ] | The disk extent mapping table for internal Mapped RAID |

The Is_internal variable is set to zero except for "internal" RGs, i.e., those storing metadata used by the operating components rather than those storing user data. In particular, this variable would be set for an internal RG used to implement the pool device 78. In this case, the Disk_extent_count and Disk_extent_mapping are used to specify the extent count and mapping for the disk extents 52 that make up that internal RAID group. When Is_internal is zero, as it is for user RGs 76 for example, then the extent count and mapping are stored in the pool device 78, so the Disk_extent_count and Disk_extent_mapping values are not used. This structure is used because the internal Mapped RAID's mapping table usually has just one or two RAID extents, in contrast to uRGs 76 that generally have many more RAID extents and thus benefit from the scalability or being stored in the pool 74.

2. Mapping Metadata of Mapped RAID and Disk Pool

Beyond the basic configurations, both the mapped RAID and disk pool need additional configurations to describe and manage the disks 12 and disk extents 52.

Disk Pool Mapping Metadata 84

The mapping 84 can be realized by an extent table holding information for all the disk extents 52 of a pool 74.

Figure 7:
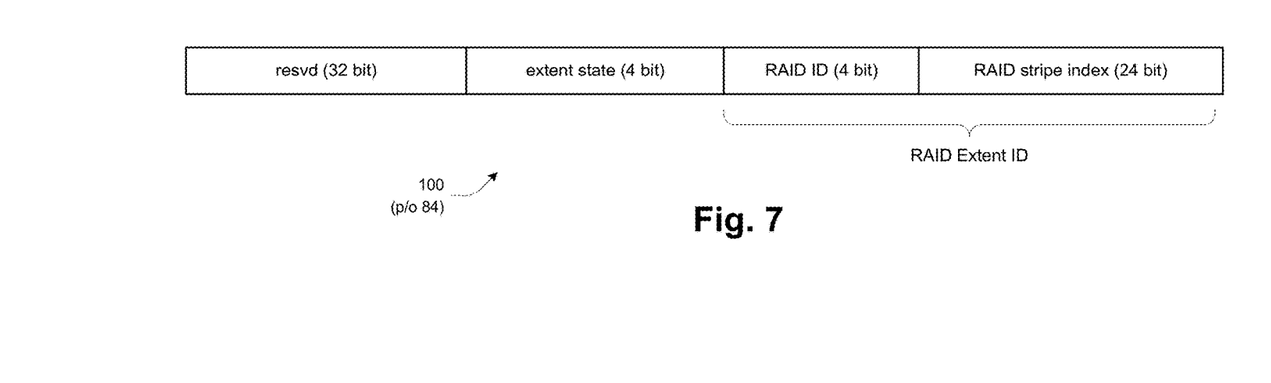
FIG. 7 is a schematic diagram of a pool mapping element.

FIG. 7 shows a single extent table item 100 (shown as part of (p/o) the mapping 84) used to hold information for a single disk extent 52. For each disk 36 of a given pool 74, the mapping table is used to track the state of the extents and to identify the RAID Extents to which the disk extents are mapped. This table for each disk makes a large contribution to the memory cost, which is a function of the disk count, disk capacity and disk extent size. As shown below, the disk pool mapping metadata 84 may be 1.8 gigabytes when the disk extent size is small.

As shown in FIG. 7, in one embodiment, 8 bytes are sufficient to describe the disk extent information. The layout of the eight bytes may be as follows:

24 bits RAID stripe index: identifies RAID extent index which this disk extent maps to
4 bits RAID ID: identifies the mapped RG
4 bits extent state: identifies disk extent status as follows:
  DISK_EXTENT_STATE_FREE
  DISK_EXTENT_STATE_CONSUMED
  DISK_EXTENT_STATE_EOL
  DISK_EXTENT_STATE_DEAD
32 bits reserved for future expansion The following are example total sizes of the pool mapping metadata 84:

| disk extent size (MB) | disk capacity (TB) | # disks | Metadata Size (MB) |
| --- | --- | --- | --- |
| 64 | 30 | 500 | 1875 |
| 256 | 30 | 500 | 468 |
| 1024 | 30 | 500 | 117 | uRG Mappings 92

The uRG mappings 92 can also be realized by a RAID extent table holding information for all the RAID extents 52 of a uRG 76.

Figure 8:
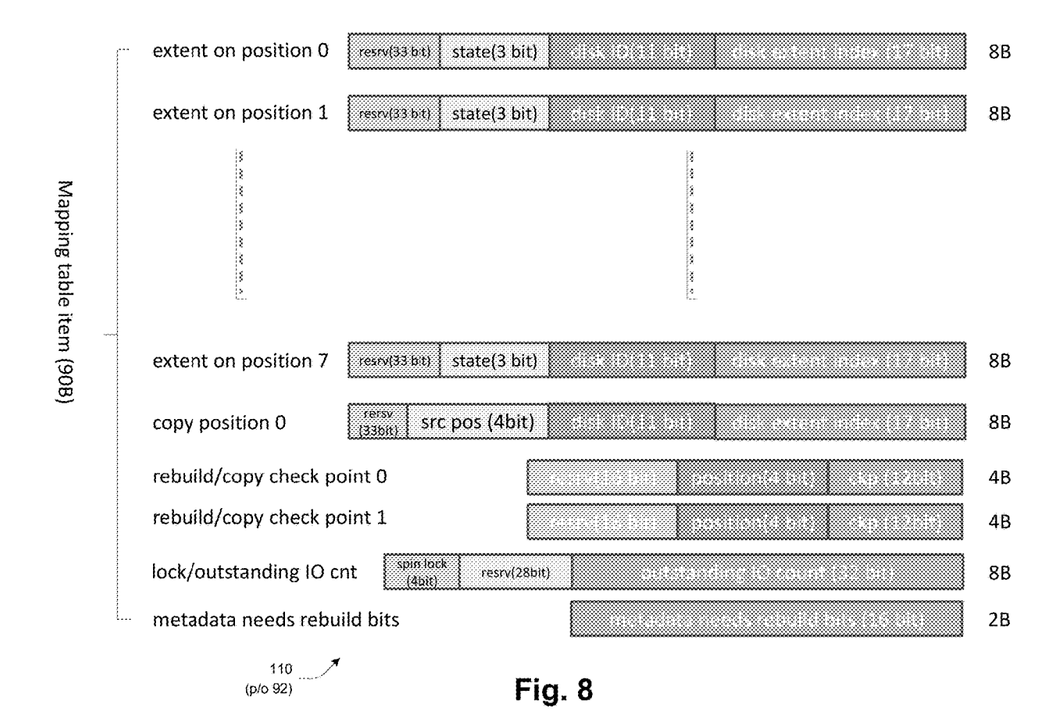
FIG. 8 is a schematic diagram of a mapped RAID mapping element.

FIG. 8 shows a mapping table item 110 (shown as part of mappings 92) for one RAID extent of a uRG 76. One of these items 110 is used for each RAID extent of the uRG 76. Among other elements, it includes a set of eight mapping entries (top-most 8 items in FIG. 8) providing up to eight mappings, which is sufficient to support an x:8 RAID ratio, such as the 6:8 ratio of (6D+2P) RAID-6. These mapping entries correspond to each of the 8 extent positions, numbered 0 through 7. In the illustrated embodiment, each entry is 8 bytes (8B) in size, and includes:
  Disk extent index: the disk extent index for the corresponding RAID extent position
  Disk id: the identifier of the disk Dx storing the disk extent
  State: information describing current disk extent state:
    EXTENT_STATE_INVALID
    EXTENT_STATE_NM
    EXTENT_STATE_RL
    EXTENT_STATE_RB
    EXTENT_STATE_CP
In the illustrated example, the mapping table item 110 also holds additional data items (bottom-most 6 items in FIG. 8) that are not pertinent to the present disclosure.

The overall mapping table size, which includes the set of all mapping elements 110 for all RAID groups of a pool 74, is a function of the number of disks 36, the disk extent size, the disk capacity and the RAID policy, as well as the size of the individual entries 100 (which is 90 bytes (90B) in this example). As shown in the following table of examples, the total metadata size may be on the order of 3.5 gigabytes in some embodiments:

| RAID policy | disk extent size [MB] | disk capacity [MB] | # disks | metadata size [MB] |
|---|---|---|---|---|
| 6D + 2P R6 | 64 | 30 | 500 | 3515 |
| 6D + 2P R6 | 256 | 30 | 500 | 878 |
| 6D + 2P R6 | 1024 | 30 | 500 | 219 |

Figure 9:
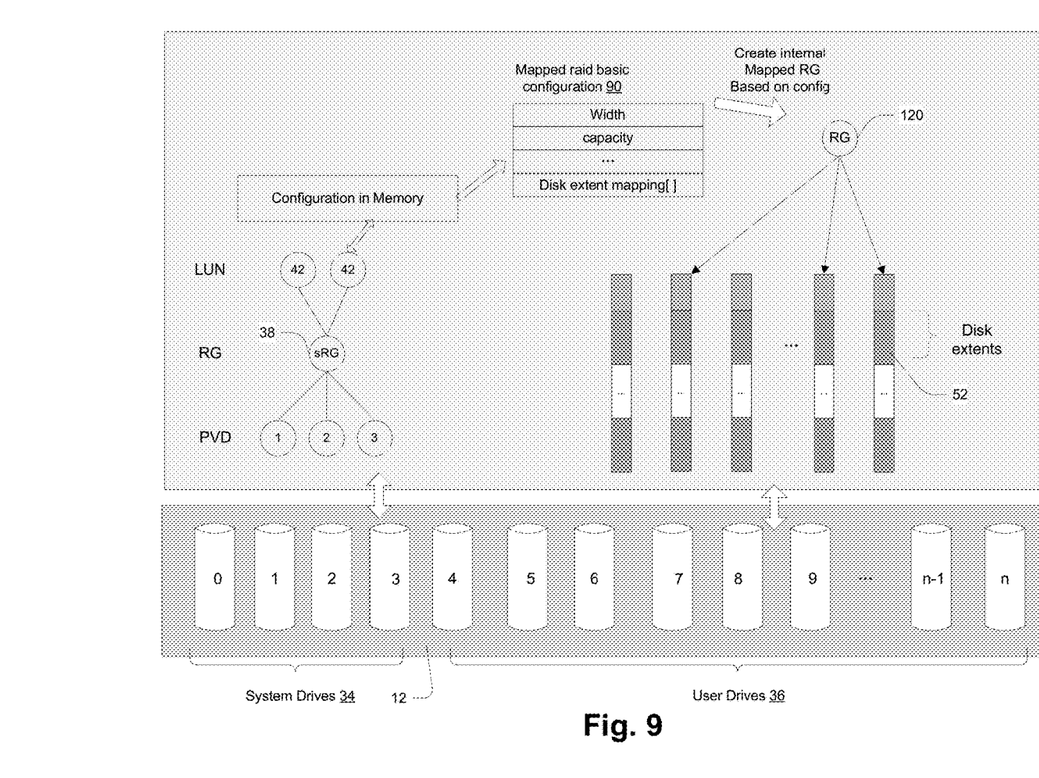
FIG. 9 is a schematic diagram depicting creation of an internal mapped RAID from basic configurations.

FIG. 9 illustrates the creation of an internal mapped RAID group (RG) 120 used as the pool device 78 stored on user drives 36, from basic configurations that are stored on the system drives 34. The basic configuration information includes which part of disk extents will be used by internal mapped RG 120. When the system boots up, it loads basic system configuration from the system drives 34, then sets the an internal mapped RAID group 120 to store the pool and mapped RAID mappings as explained above. After that, the extent pool 74 and mapped RAID load their respective metadata from the internal mapped RG 120. Note that FIG. 9 shows only one instance of the process, which occurs in both the active SP 30 and the passive SP 32 in an embodiment such as that of FIG. 2.

Figure 10:
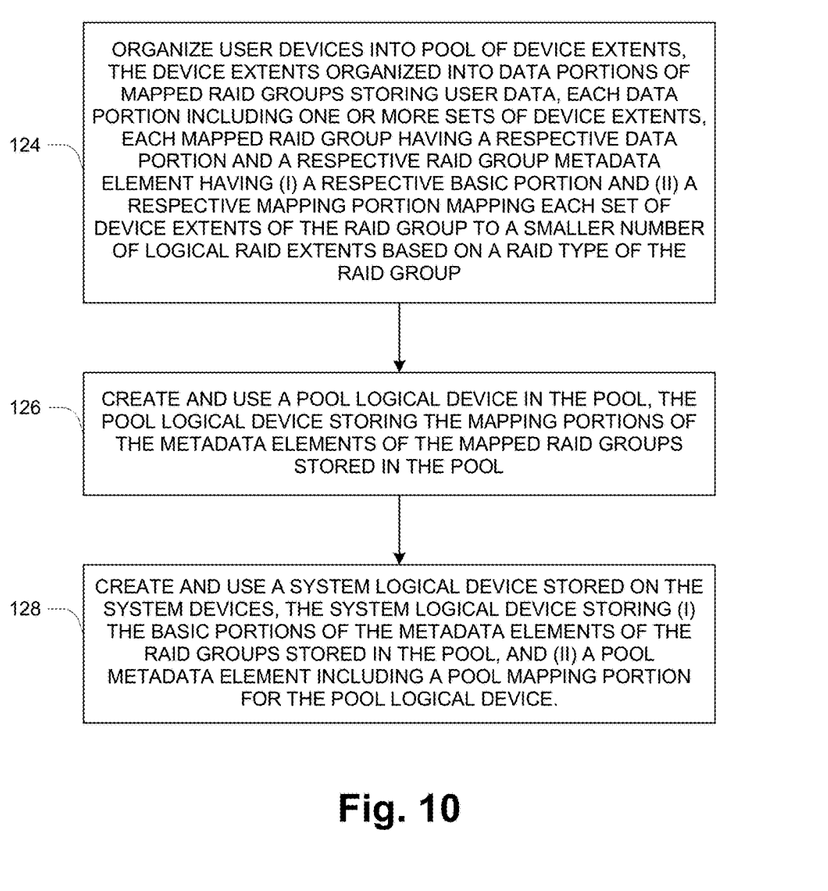
FIG. 10 is a flow diagram of overall operation.

FIG. 10 describes pertinent operation of the data storage system at a high level in connection with creating, maintaining and utilizing logical storage structures as described herein. Generally these operations are performed by functional components of the processing circuitry 18 as described above.

At 124, the user devices are organized into a pool of device extents, and the device extents organized into data portions of mapped RAID groups storing user data. Each data portion includes one or more sets of device extents, and each mapped RAID group has a respective data portion and a respective RAID group metadata element having (i) a respective basic portion and (ii) a respective mapping portion mapping each set of device extents of the RAID group to a smaller number of logical RAID extents based on a RAID type of the RAID group.

At 126, a pool logical device is created in the pool for use. The pool logical device stores the mapping portions of the metadata elements of the mapped RAID groups stored in the pool.

At 128, a system logical device is created on the system devices for use. The system logical device stores (i) the basic portions of the metadata elements of the RAID groups stored in the pool, and (ii) a pool metadata element including a pool mapping portion for the pool logical device.

Disk Pool Creation and Internal Mapped Raid LUN

Figure 11:
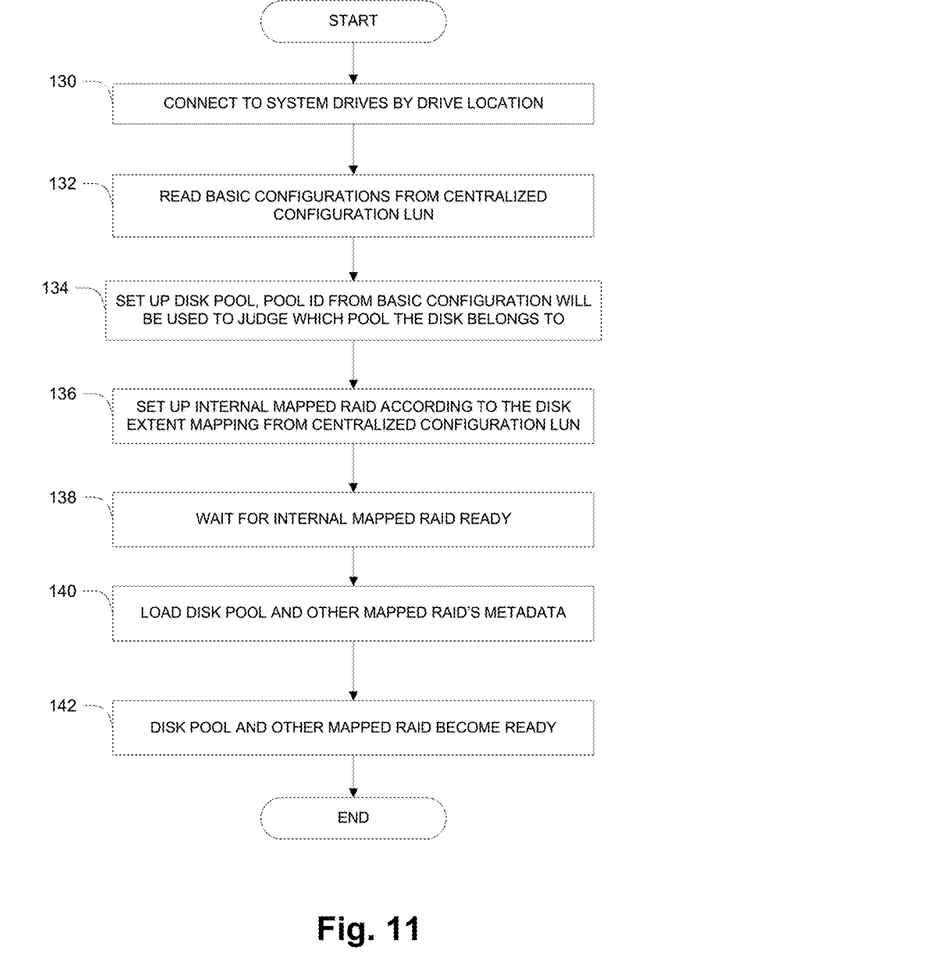
FIG. 11 is a flow diagram for creation of disk pool and internal mapped RAID.

FIG. 11 shows a process for disk pool and Internal Mapped RAID creation. When a disk pool 74 is created, an internal mapped raid LUN (e.g., 120) is created to store the disk pool and mapped raid metadata as explained above.

The process is as follows:
  130: Connect to system drives by drive location
  132: Read basic configurations from centralized configuration LUN (e.g., 42)
  134: Set up disk pool, pool ID from basic configuration will be used to judge which pool the disk belongs to
  136: Set up internal Mapped RAID according to the disk extent mapping from centralized configuration LUN
  138: Wait for internal Mapped RAID ready
  140: Load disk pool and other Mapped RAID'S metadata
  142: Disk pool and other Mapped RAID become ready A disk pool ID is assigned or allocated when a disk pool 74 is created. The disk pool ID is saved to the centralized configuration LUN (e.g., 42) for each disk 36 in the pool 74. Each disk pool 74 creates its own internal Mapped Raid LUN to save the metadata of the disk pool and mapped RAID.

Multi-Level Booting Sequence

Figure 12:
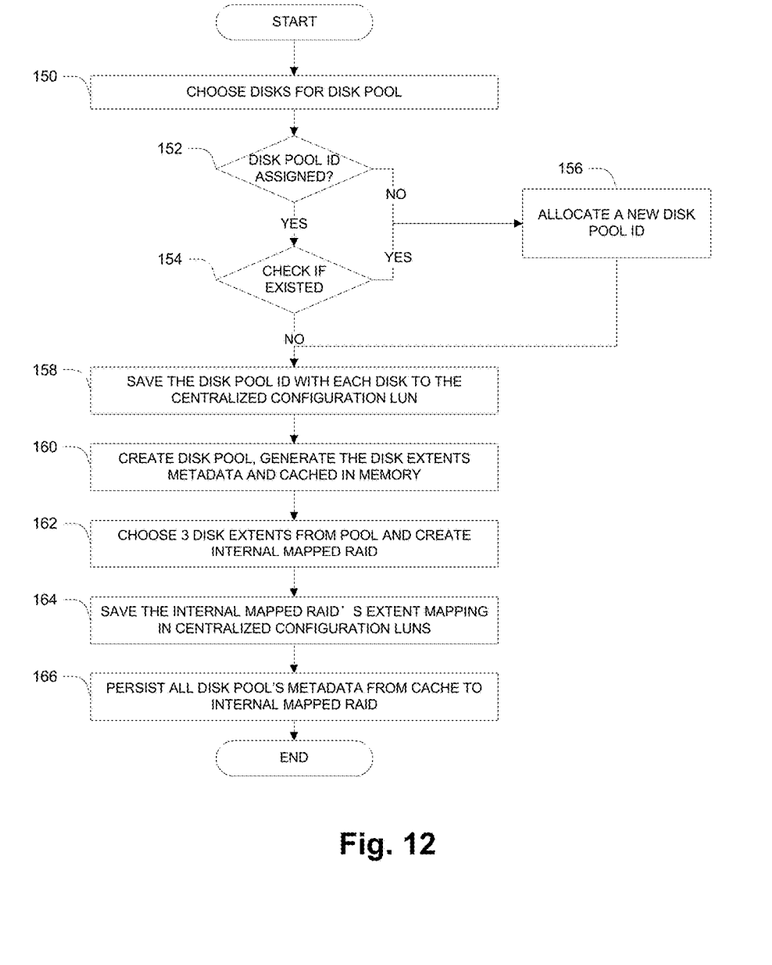
FIG. 12 is a flow diagram for a multi-level booting sequence.

FIG. 12 shows a process for a multi-level booting sequence. The booting is divided into two stages. First, basic configuration is loaded from the system drives 34. After loading the configuration to memory, the disk pool and internal Mapped RAID are set up with the configuration. Once internal Mapped RAID is ready to use, disk pool and Mapped RAID metadata is loaded from it.

Figure 13:
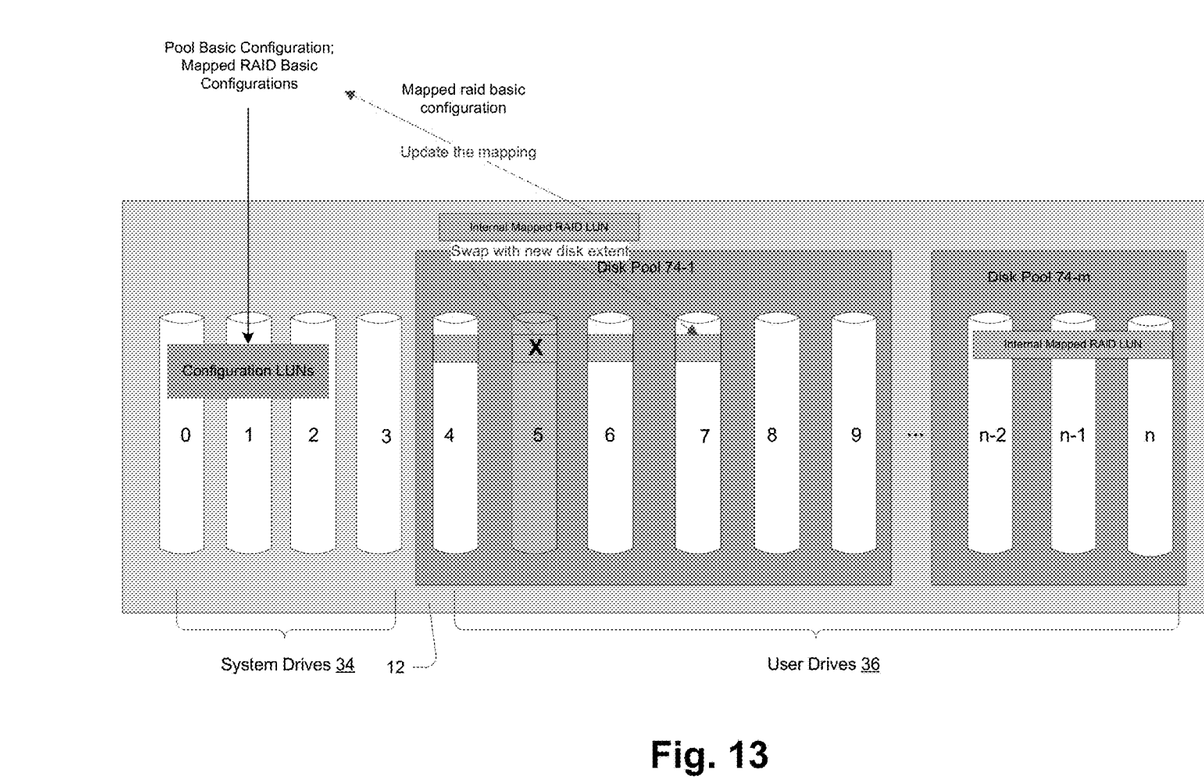
FIG. 13 is a schematic diagram showing disk extent swapping for internal mapped RAID.

More particularly, the following is the process:
  150: Choose disks for disk pool
  152: Determine if disk pool ID assigned
  154: Check if existed
  156: Allocate a new disk pool ID
  158: Save the disk pool ID with each disk to the centralized configuration LUN
  160: Create disk pool, generate the disk extents metadata and cached in memory
  162: Choose 3 disk extents from pool and create Internal Mapped Raid
  164: Save the internal Mapped Raid's extent mapping in Centralized configuration LUNs
  166: Persist all disk pool's metadata from cache to internal mapped raid Self-Management of Internal Mapped RAID FIG. 13 illustrates disk extent swapping for an internal mapped RAID, which is composed of disk extents 52 in the pool 74. One disk extent is reserved from every disk 12 in the disk pool 74. Initially, only 3 disk extents are chosen to create the internal Mapped RAID. A mapped RAID background service monitors and repairs the Mapped RAID when failures occur. FIG. 13 illustrates a failure of disk #5 as an example. When a threshold number of extents (e.g. one or two) become damaged or otherwise unusable, the background service sets a timestamp. Once the timeout is triggered, the background service chooses a spared disk extent (e.g., from disk #7 as shown) to replace the broken one, and rebuilds the internal mapped RAID using the new disk extent. The disk extent mapping table is updated to the centralized configuration LUN during the swap job transaction.

While various embodiments of the invention have been particularly shown and described, it will be understood by those skilled in the art that various changes in form and details may be made therein without departing from the spirit and scope of the invention as defined by the appended claims.

What is claimed is:

1. A data storage system comprising a set of storage devices, processing circuitry, host interface circuitry coupling the processing circuitry to remote host computers, and device interface circuitry coupling the processing circuitry to the storage devices, the processing circuitry being configured and operative to execute computer program instructions of functional components to (a) organize the storage devices as system devices and user devices, and (b) create, maintain and utilize logical storage structures including:
   1) a pool of device extents on the user devices, the device extents organized into data portions of mapped RAID groups storing user data, each data portion including one or more sets of device extents, each mapped RAID group having a respective data portion and a respective RAID group metadata element having (i) a respective basic portion and (ii) a respective mapping portion mapping each set of device extents of the RAID group to a smaller number of logical RAID extents based on a RAID type of the RAID group;
   2) a pool logical device in the pool, the pool logical device storing the mapping portions of the metadata elements of the mapped RAID groups stored in the pool; and
   3) a system logical device stored on the system devices, the system logical device storing (i) the basic portions of the metadata elements of the RAID groups stored in the pool, and (ii) a pool metadata element including a pool mapping portion for the pool logical device,
   wherein the mapping portion of the RAID group metadata element of each mapped RAID group includes a set of n mapping entries sufficient to support an x:n RAID ratio with x being less than n, the mapping entries corresponding to respective extent positions on respective distinct ones of the user devices, each mapping entry for a given mapped RAID group including (1) a device identifier identifying a respective user device storing a respective device extent, and (2) a device extent index identifying a location of the respective device extent on the respective user device.

2. The data storage system of claim 1, wherein the pool logical device is an internal mapped RAID group, and the pool metadata element includes both a basic portion and the mapping portion for the internal mapped RAID group, the mapping portion mapping a set of device extents of the internal RAID group to a smaller number of logical RAID extents based on a RAID type of the internal RAID group.

3. The data storage system of claim 2, wherein the internal RAID group is a 3-way mirrored RAID group utilizing three disk extents to store a corresponding single logical RAID group extent.

4. The data storage system of claim 1, wherein there are at least three system devices, and wherein the system logical device is a 3-way mirrored RAID group including at least the three system devices.

5. The data storage system of claim 1, wherein each of the device extents has an extent size less than $\frac{1}{1000}$ of the storage capacity of a single user device, and wherein there are a sufficient number of user devices that a sum of sizes of RAID group metadata elements for all mapped RAID groups on the user devices is greater than $\frac{1}{100}$ of the storage capacity of the system logical device.

6. The data storage system of claim 1, wherein the pool is a first pool, and the logical structures further include one or more additional pools each organized into mapped RAID groups in the same manner in which the first pool is organized, and wherein (1) the pool logical device stores the mapping portions of the metadata elements of the mapped RAID groups stored in the additional pools, and the system logical device stores the basic portions of the metadata elements of the RAID groups stored in the additional pools.

7. A method of operating a data storage system including a set of storage devices organized as system devices and user devices to create, maintain and utilize logical storage structures, comprising:
   1) organizing the user devices into a pool of device extents, the device extents organized into data portions of mapped RAID groups storing user data, each data portion including one or more sets of device extents, each mapped RAID group having a respective data portion and a respective RAID group metadata element having (i) a respective basic portion and (ii) a respective mapping portion mapping each set of device extents of the RAID group to a smaller number of logical RAID extents based on a RAID type of the RAID group;
   2) creating and using a pool logical device in the pool, the pool logical device storing the mapping portions of the metadata elements of the mapped RAID groups stored in the pool; and
   3) creating and using a system logical device stored on the system devices, the system logical device storing (i) the basic portions of the metadata elements of the RAID groups stored in the pool, and (ii) a pool metadata element including a pool mapping portion for the pool logical device,
   wherein the mapping portion of the RAID group metadata element of each mapped RAID group includes a set of n mapping entries sufficient to support an x:n RAID ratio with x being less than n, the mapping entries corresponding to respective extent positions on respective distinct ones of the user devices, each mapping entry for a given mapped RAID group including (1) a device identifier identifying a respective user device storing a respective device extent, and (2) a device extent index identifying a location of the respective device extent on the respective user device.

8. The method of claim 7, wherein creating the logical storage structures includes:
   connecting to the system devices based on device location in an enclosure;
   reading basic configurations from the system logical device as a centralized configuration LUN on the system devices;
   setting up the pool, using a pool identifier from the basic configurations to judge which pool a given user device belongs to;
   setting up the pool logical device as an internal mapped RAID according to device extent mapping from the centralized configuration LUN;
   upon the internal mapped RAID becoming ready, loading disk pool and other mapped RAID metadata into memory for use.

9. The method of claim 7, wherein creating the logical storage structures includes a multi-level booting sequence including:
   choosing devices for the pool;
   determining if a disk pool identifier is assigned or existed, and if not then allocating a new disk pool identifier;

saving the disk pool identifier with each device to the system logical device as a centralized configuration LUN;

creating the pool, generating the device extent metadata and caching it in memory;

choosing a number of device extents from the pool and using them to create the pool logical device as an internal mapped RAID;

saving extent mapping for the internal mapped RAID in the Centralized configuration LUN;

persisting all pool metadata from memory to the internal mapped RAID.

10. The data storage system of claim 1, wherein for each mapped RAID group, the device extents are distributed across a corresponding set of the user devices, and each of the user devices stores corresponding device extents of multiple mapped RAID groups.

11. The data storage system of claim 1, wherein n is equal to 8, enabling the data storage system to support mapped RAID with up to an x:8 RAID ratio.

12. The method of claim 7, wherein for each mapped RAID group, the device extents are distributed across a corresponding set of the user devices, and each of the user devices stores corresponding device extents of multiple mapped RAID groups.

13. The method of claim 7, wherein n is equal to 8, enabling the data storage system to support mapped RAID with up to an x:8 RAID ratio.

* * * * *